United States Patent
Ciabrini et al.

(10) Patent No.: US 9,098,881 B2
(45) Date of Patent: Aug. 4, 2015

(54) METHOD AND SYSTEM FOR A PRE-SHOPPING RESERVATION SYSTEM WITH INCREASED SEARCH EFFICIENCY

(75) Inventors: Damien Ciabrini, Magagnosc (FR);
Claudine Reynaud, Grasse (FR);
Guillaume Legrand, Grasse (FR);
Rémy Gole', Grasse (FR); Luc Isnardy, Cagnes sur Mer (FR)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 13/185,417

(22) Filed: Jul. 18, 2011

(65) Prior Publication Data

US 2012/0330693 A1 Dec. 27, 2012

(30) Foreign Application Priority Data

Jun. 27, 2011 (EP) .................................... 11305813

(51) Int. Cl.
*G06Q 10/00* (2012.01)
*G06Q 50/14* (2012.01)
*G06Q 10/02* (2012.01)

(52) U.S. Cl.
CPC ................ *G06Q 50/14* (2013.01); *G06Q 10/02* (2013.01)

(58) Field of Classification Search
CPC .............................. G06Q 10/02; G06Q 10/025
USPC ........................................................ 705/5
See application file for complete search history.

(56) References Cited

U.S. PATENT DOCUMENTS

| | | |
|---|---|---|
| 4,862,357 A | 8/1989 | Ahlstrom et al. |
| 5,495,606 A | 2/1996 | Borden et al. |
| 5,822,747 A | 10/1998 | Graefe et al. |
| 5,924,090 A | 7/1999 | Krellenstein |
| 6,067,541 A | 5/2000 | Raju et al. |
| 6,392,997 B1 | 5/2002 | Chen |
| 7,437,408 B2 | 10/2008 | Schwartz et al. |
| 7,454,462 B2 | 11/2008 | Belfiore et al. |

(Continued)

FOREIGN PATENT DOCUMENTS

| | | |
|---|---|---|
| CN | 101187946 A | 5/2008 |
| EP | 1643388 A1 | 4/2006 |

(Continued)

OTHER PUBLICATIONS

European Search Report for European Application No. 11 30 5280 (Oct. 20, 2011).

(Continued)

*Primary Examiner* — Allen J Jung
(74) *Attorney, Agent, or Firm* — Thompson Hine LLP

(57) ABSTRACT

The method according to a preferred embodiment of the present invention provides a pre-shopping reservation tool which allows storing entire catalogs of air travels from many providers, while ensuring a high cache accuracy at limited operational costs. The system makes use of the fares knowledge to merge identical travel recommendations coming from different travel providers (airline, travel agencies) when possible, i.e. when fares are public and not negotiated for a specific travel provider. This prevents redundant prices to be stored in the system and improves its cost effectiveness. The system according to a preferred embodiment of the present invention relies on several dedicated data analysis engines to optimize the cost of data pre-computations while at the same time maintaining good data accuracy.

23 Claims, 10 Drawing Sheets

(56) References Cited

U.S. PATENT DOCUMENTS

| | | | |
|---|---|---|---|
| 7,454,761 B1 | 11/2008 | Roberts et al. | |
| 7,512,652 B1 | 3/2009 | Appelman et al. | |
| 7,778,962 B2 | 8/2010 | Shah et al. | |
| 7,890,461 B2 | 2/2011 | Oeda et al. | |
| 7,925,624 B2 | 4/2011 | Vosshall et al. | |
| 2002/0078045 A1 | 6/2002 | Dutta | |
| 2002/0078150 A1 | 6/2002 | Thompson et al. | |
| 2002/0143933 A1 | 10/2002 | Hind et al. | |
| 2003/0004760 A1* | 1/2003 | Schiff et al. | 705/5 |
| 2003/0023715 A1 | 1/2003 | Reiner et al. | |
| 2003/0195959 A1 | 10/2003 | Labadie et al. | |
| 2003/0200194 A1 | 10/2003 | Arnold et al. | |
| 2003/0225888 A1 | 12/2003 | Wason | |
| 2003/0233473 A1 | 12/2003 | Bonhomme et al. | |
| 2004/0006625 A1 | 1/2004 | Saha et al. | |
| 2004/0006711 A1 | 1/2004 | Krishnaswamy et al. | |
| 2004/0078251 A1 | 4/2004 | DeMarcken | |
| 2004/0267623 A1* | 12/2004 | Vivadelli et al. | 705/26 |
| 2005/0008163 A1 | 1/2005 | Leser et al. | |
| 2005/0026103 A1 | 2/2005 | Wasylucha | |
| 2005/0108068 A1 | 5/2005 | Marcken et al. | |
| 2005/0108069 A1 | 5/2005 | Shiran et al. | |
| 2005/0108298 A1 | 5/2005 | Iyengar et al. | |
| 2005/0262100 A1 | 11/2005 | Piper | |
| 2006/0155857 A1 | 7/2006 | Feenan, Jr. et al. | |
| 2006/0212583 A1 | 9/2006 | Beadle et al. | |
| 2007/0110010 A1 | 5/2007 | Kotola et al. | |
| 2007/0124290 A1 | 5/2007 | Swanson et al. | |
| 2007/0168238 A1 | 7/2007 | Marcken et al. | |
| 2007/0192492 A1 | 8/2007 | Okazaki | |
| 2007/0234417 A1 | 10/2007 | Blakley, III et al. | |
| 2008/0028084 A1 | 1/2008 | Bloching et al. | |
| 2008/0091480 A1 | 4/2008 | Geoghegan et al. | |
| 2008/0126567 A1 | 5/2008 | Wilson | |
| 2008/0167906 A1 | 7/2008 | De Marcken | |
| 2008/0167973 A1 | 7/2008 | De Marcken | |
| 2008/0262878 A1* | 10/2008 | Webby et al. | 705/5 |
| 2008/0288644 A1 | 11/2008 | Gilfix et al. | |
| 2009/0019118 A1 | 1/2009 | Jones et al. | |
| 2009/0234682 A1* | 9/2009 | Baggett et al. | 705/6 |
| 2009/0320073 A1 | 12/2009 | Reisman | |
| 2010/0049556 A1 | 2/2010 | Liu et al. | |
| 2010/0064349 A1 | 3/2010 | Randle et al. | |
| 2010/0094856 A1 | 4/2010 | Rodrick et al. | |
| 2010/0198628 A1 | 8/2010 | Rayner | |
| 2010/0220604 A1 | 9/2010 | Skog et al. | |
| 2010/0305983 A1 | 12/2010 | De Marcken | |
| 2011/0029336 A1 | 2/2011 | Vieillard-Baron et al. | |
| 2011/0047018 A1 | 2/2011 | Lieblang et al. | |
| 2011/0055202 A1 | 3/2011 | Heimendinger | |
| 2011/0082942 A1 | 4/2011 | Takei et al. | |
| 2011/0149951 A1 | 6/2011 | Qiu et al. | |
| 2012/0131212 A1 | 5/2012 | Tang et al. | |
| 2012/0239620 A1 | 9/2012 | Masini et al. | |
| 2012/0239724 A1 | 9/2012 | Masini et al. | |
| 2012/0239818 A1 | 9/2012 | Defayet et al. | |
| 2012/0284062 A1 | 11/2012 | Aubry et al. | |

FOREIGN PATENT DOCUMENTS

| | | | |
|---|---|---|---|
| EP | 2 259 217 A1 | 12/2010 | |
| KR | 102005006383 | 1/2005 | |
| WO | WO 98/32064 A2 | 7/1998 | |
| WO | 9960478 A1 | 11/1999 | |
| WO | WO 00/63808 A1 | 10/2000 | |
| WO | 0219105 A1 | 3/2002 | |
| WO | 0229640 A1 | 4/2002 | |
| WO | WO 2008/086146 A2 | 7/2008 | |

OTHER PUBLICATIONS

European Search Report for European Patent Application No. 11305518 (Sep. 15, 2011).
European Search Report for European Application No. 11 30 5281 (Aug. 12, 2011).
European Search Report for European Application No. 11 30 5277 (Aug. 10, 2011).
European Search Report for European application No. 11305278.1 (Jul. 5, 2011).
Commonly-assigned, co-pending U.S. Appl. No. 13/113,008 for "Method and System for an Improved Reservation System Optimizing Repeated Search Requests," (Unpublished, filed May 20, 2011).
Commonly-assigned, co-pending U.S. Appl. No. 13/084,512 for "Method and System for Synchronization Mechanism on Multi-Server Reservation System," (Unpublished, filed Apr. 11, 2011).
Commonly-assigned, co-pending U.S. Appl. No. 13/084,251 for "Method and System for Centralized Reservation Context Management on Multi-Server Reservation System," (Unpublished, filed Apr. 11, 2011).
Commonly-assigned, co-pending U.S. Appl. No. 13/065,312 for "Method and System for Providing a Session Involving a Plurality of Software Applications," (Unpublished, filed Mar. 18, 2011).
Commonly-assigned, co-pending U.S. Appl. No. 13/065,273 for "Method and System for Providing a Session in a Heterogeneous Environment," (Unpublished, filed Mar. 18, 2011).
Keen et al., "Patterns: SOA Foundation—Business Process Management Scenario," Sections 2.2, 2.3, 5.1-5.3, 7.1-7.4, ibm.com/redbooks, pp. 1-523 (Aug. 1, 2006).
"WebSphere Application Server V6 Scalability and Performance Handbook," IBM, pp. 1-370 (May 1, 2005).
Sadtler et al., "Patterns: Broker Interactions for Intra- and Inter-enterprise," Sections 3.3-3.5, 4.1-4.3, 5.1-5.3, 6.1-6.3, 9.1-9.6, ibm.com/redbooks, pp. 1-303 (Jan. 1, 2004).
"WebSphere® Edge Server for Multiplatforms: Getting Started," Version 2.0, IBM, pp. 1-119 (Dec. 1, 2001).
European Search Report for European Application No. 11 30 5813 (Nov. 10, 2011).
Screenshot of Kayak's Home Page, http://www.kayak.com/news/kayak-adds-map-based-search-tool-to-popular-ipad-app.bd.html, p. 1 (Copyright 2011).
Screenshot of Opodo's Home Page, http://promos.opodo.co.uk/airtools/ escape_map.html, pp. 1-2 (Copyright 2011).
Screenshot of Lufthansa's Trip Finder Home Page, http://www.lufthansa.com/online/portal/lh/us/nonav/local?nodeid=3322431 &l=en, p. 1 (Downloaded from the Internet Jul. 18, 2011).
Screenshot of TravelTainment's Home Page, http://www.traveltainment.fr/a-propos-de-traveltainment/qui-sommes-nous/, p. 1 (Copyright 2010).
USPTO, Notice of Allowance issued in related U.S. Appl. No. 13/065,312 dated Jan. 18, 2013.
USPTO, Office Action issued in related U.S. Appl. No. 13/084,512 dated Sep. 7, 2012.
European Patent Office, extended European search report issued in related European application No. 11305280.7 dated Jan. 17, 2012.
Le Hien Luu, Notice of Allowance issued in related U.S. Appl. No. 13/065,312 dated Oct. 2, 2012.
European Patent Office, International Search Report issued in International application No. PCT/IB2012/002668 dated Mar. 7, 2013.
IP Australia, Examination Report issued in Patent Application No. 2012278229 dated Jun. 24, 2014.
European Patent Office, Official Action issued in Application No. 11 305 813.5 dated Sep. 2, 2014.
US, Non-Final Office Action; U.S. Appl. No. 13/674,505; (May 8, 2015).
US, Non-Final Office Action; U.S. Appl. No. 13/669,993; (Jun. 17, 2015).
AU, Patent Examination Report No. 1; Australian Patent Application No. 2012378631 (Jun. 19, 2015).

* cited by examiner

METHOD AND SYSTEM FOR A PRE-SHOPPING RESERVATION SYSTEM WITH INCREASED SEARCH EFFICIENCY

PRIORITY CLAIM

This application claims the benefit of European Patent Application No. 11305813.5 filed Jun. 27, 2011, the disclosure of which is incorporated herein by reference.

FIELD OF THE INVENTION

The present invention relates to the field of reservation systems, particularly to a method and system for a massive search platform increasing efficiency in travel searches.

BACKGROUND OF THE INVENTION

State of the art reservation systems are normally based on dedicated Global Distribution Systems (GDS), as for example airlines reservation systems which provide flight search applications for shopping business like flight booking. This activity, also called "shopping for booking" involves a lot of computation and may take some time. To minimize this delay, users usually have few degrees of freedom: they must specify origin and destination cities, outbound and inbound dates of the journey. To further minimize the delay, they may specify e.g. a preferred operating carrier and cabin class if the have precise flights requirements. Users search for the best price for a particular travel (city pair, departure and arrival date) in the aim of booking it eventually. The search usually offers some flexibility: e.g. returning the 100 cheapest flights recommendations for the requested travel; returning cheaper flights for closely-related dates. All needed computation (searching the cheapest fares and rules combination, checking seat availability of candidate flights . . . ) are performed at the time of the query, which ensures that the returned recommendations will be available for booking. Consequently, such search transactions are costly and take several seconds to complete. This cost precludes them from answering more open search requests, such as for instances the cheapest flight for the coming two or three months. While this is advantageous for system performance and for response times, it is not ideal for users who would certainly appreciate a more user friendly interaction with wider freedom in the parameters choice.

A different approach to the task of searching air travel prices is the so called "pre-shopping". With this term we refer to those activities which require interrogations of data bases through a reservation system but which do not necessarily result in a proper booking. This activities are of key importance for airlines or travel agencies, because, even if they do not generate an immediate revenue they can influence the future choice of their potential customers. It would be highly appreciated a tool able to provide a zero-delay response to a user's query with many degrees of freedom. With pre-shopping, users can browse a carrier or travel agency's entire catalogue of air travels. Those users wish to make their mind prior to shopping by browsing recommendations over billions of travels recommendations. Compared to shopping, browsing recommendations implies instantaneous responses to searches (few tens of milliseconds). The typical approach of pre-shopping systems is thus to let users browse a cache of pre-computed travel recommendations. With such approach, the search queries can be much more powerful: users can search on many open criteria: origin city only, range of dates, range of price . . . . For the sake of the example:

"Search for 2 or 3 weeks trips from Paris to any destination within the next 12 month below 600 Euros"

The drawback of this approach is that the recommendations returned to users are only guaranteed to be valid at the time of their pre-computation. In particular, they may no longer be eligible for booking at the time of the search.

Unlike other cache browsing domains (e.g. WWW search), air travel pre-shopping is very sensible to air travel price volatility: the best prices of flights in the coming weeks is likely to change every day. This volatility greatly impacts the cache accuracy, i.e., the consistency between price in pre-shopping and price in shopping. The usual accuracy rate in the industry is about 20-30%.

Maintaining higher cache accuracy often means massive re-computations (to deal with the entire catalogue of travel) and also frequent re-computations (to deal with flight volatility). This is very demanding in hardware resources.

State of the art pre-shopping tools have some drawbacks which limit the efficiency of the tool. For example Travel-Tainment pre-shopping platform: ("TTibe: TravelTainment Internet Booking Engine" http://www.traveltainment.fr/a-propos-de-traveltainment/qui-sommes-nous/) provides browsing facilities over its own database of pre-computed travels (flights departing from German cities mainly). The air travel data are provided e.g. by Amadeus' Extreme Pricer, a product of Massive Computation Platform (MCP). Travel data represent the cheapest flights from several thousands of city pairs, for every day of the coming year, for all stay durations between 1 and 23 days. Every day, the entire base of travel (several tens of millions of prices) is recomputed by Amadeus and sent to TravelTainment for integration into their platform. While the travel domain is rather exhaustive from its customers' standpoint, this approach has two main drawbacks:

All data are recomputed by Amadeus every day, which has an operational cost

Integrating this amount of data is costly for TravelTainment and can only be performed once a day. This has an impact on price accuracy experienced by their customers.

Other commercially available platforms are Kayak's Explore (http://wvvvv.kayak.com/news/kayak-adds-map-based-search-tool-to-popular-ipad-app.bd.html), Opodo's EscapeMap:

(http://promos.opodo.co.uk/airtools/escape_map.html),

Lufthansa's Trip Finder:

(http://www.lufthansa.com/online/portal/lh/us/nonav/local?nodeid=3322431&1=en) which is powered by Amadeus technologies. These three pre-shopping platforms have a different strategy than TravelTainment to feed their cache of pre-computed solution: they all rely on recording real shopping traffic, i.e. record the result of search transaction operated on their shopping platform. This approach has an advantage in that the pre-computation comes at almost no cost. However it comes with a series of penalties for their respective customers:

unusual destinations might not be available to pre-shopping due to recorded traffic;

there are a lot of "holes" in the price domains, due to missing dates in recorded traffic it is difficult to propose complex travel recommendations, for example advance purchase some volatile price recommendations are not updated for days (even weeks).

All these disadvantages can compromise to a great extent the pre-shopping accuracy experienced by the customers.

OBJECT OF THE INVENTION

An object of the present invention is to alleviate at least some of the problems associated with the prior art systems.

According to one aspect of the present invention there is provided a method in a distributed reservation system for generating priced travel recommendations according to non-binding travel queries, the distributed reservation system having access to a plurality of travel databases containing information on travel availability and fares according to a plurality of parameters, each travel query including a set of preferences each preference being related to a parameter selected among the plurality of parameters, the method including: maintaining on a plurality of fast access memory location a cache including a selection of pre-computed travel recommendations each travel recommendation including information on fares and/or availability for a specific travel, sorted by at least one of the plurality of parameters; assigning to each of the cached travel recommendations a score indicative of a needed refresh frequency; updating the selection of pre-computed travel recommendations by launching a massive query in the plurality of databases for refreshing the information included in at least some of the travel recommendations, wherein the frequency of the refresh of each travel recommendation depends on the assigned score; responsive to a travel query being received by the system, searching the plurality of fast access memory locations, to find those travel recommendations which fulfil the preferences included in the travel query; issuing a response to users for the travel query and updating the score of the selection of travel recommendations.

According to a second aspect of the present invention there is provided a system comprising one or more components adapted to perform the method described above.

According to a further embodiment of the present invention there is provided a computer program comprising instructions for carrying out the method described above when said computer program is executed on a computer system.

The method according to a preferred embodiment of the present invention allows storing entire catalogues of air travels from many providers, while ensuring a high cache accuracy at limited operational costs. The system makes use of the fares knowledge to merge identical travel recommendations coming from different travel providers when possible (i.e. when fares are public and not negotiated for a specific customer). This prevents redundant prices to be stored in the system and improves its cost effectiveness. The system according to a preferred embodiment of the present invention relies on several dedicated data analysis engines to optimize the cost of data pre-computations while at the same time maintaining good data accuracy.

BRIEF DESCRIPTION OF DRAWINGS

Reference will now be made, by way of example, to the accompanying drawings, in which.

DETAILED DESCRIPTION OF THE EMBODIMENTS

The distributed search platform according to a preferred embodiment of the present invention aims at storing pre-computed air travel prices and provides several advantages.

It is designed to hold entire catalogs of air travel. The search platform is able to store best prices of e.g. thousands of markets for all the days of the year to come, several possible prices per day depending of the travel's stay duration.

The distributed nature of the invention lets it scale to whatever number of markets to store.

It optimizes storage of air travel data, with the following benefits:
  Travel search efficiency: the achievable response time of search transactions is few tens of milliseconds, whatever their complexity (open destination, full year search . . . )
  Travel data update efficiency: update has a limited impact on the overall storage, which enables continuous updates, with instantaneous availability of new data.
  Travel data storage efficiency: data can be factorized if common in many catalog to further reduce storage cost.

It can maintain a high quality of pre-shopping travel recommendations at a sustainable cost. The system has various engines to detect the travels prices that require re-computations. This can drive partial re-computation to save hardware resource. The saved resource can be re-invested in other re-computations to achieve higher cache accuracy from a user's standpoint (in the range of 80-90%).

The system provides different types of search products, depending on the needs of its customers and travel providers. For the sake of the example, a carrier would need a search product to retrieve recommendations for his airline and that of its partners. On the contrary, an online travel agency would need a search product to retrieve any type of air travel without carrier filtering. Those two products may have internal specificities and may be optimized accordingly.

Figure 1:
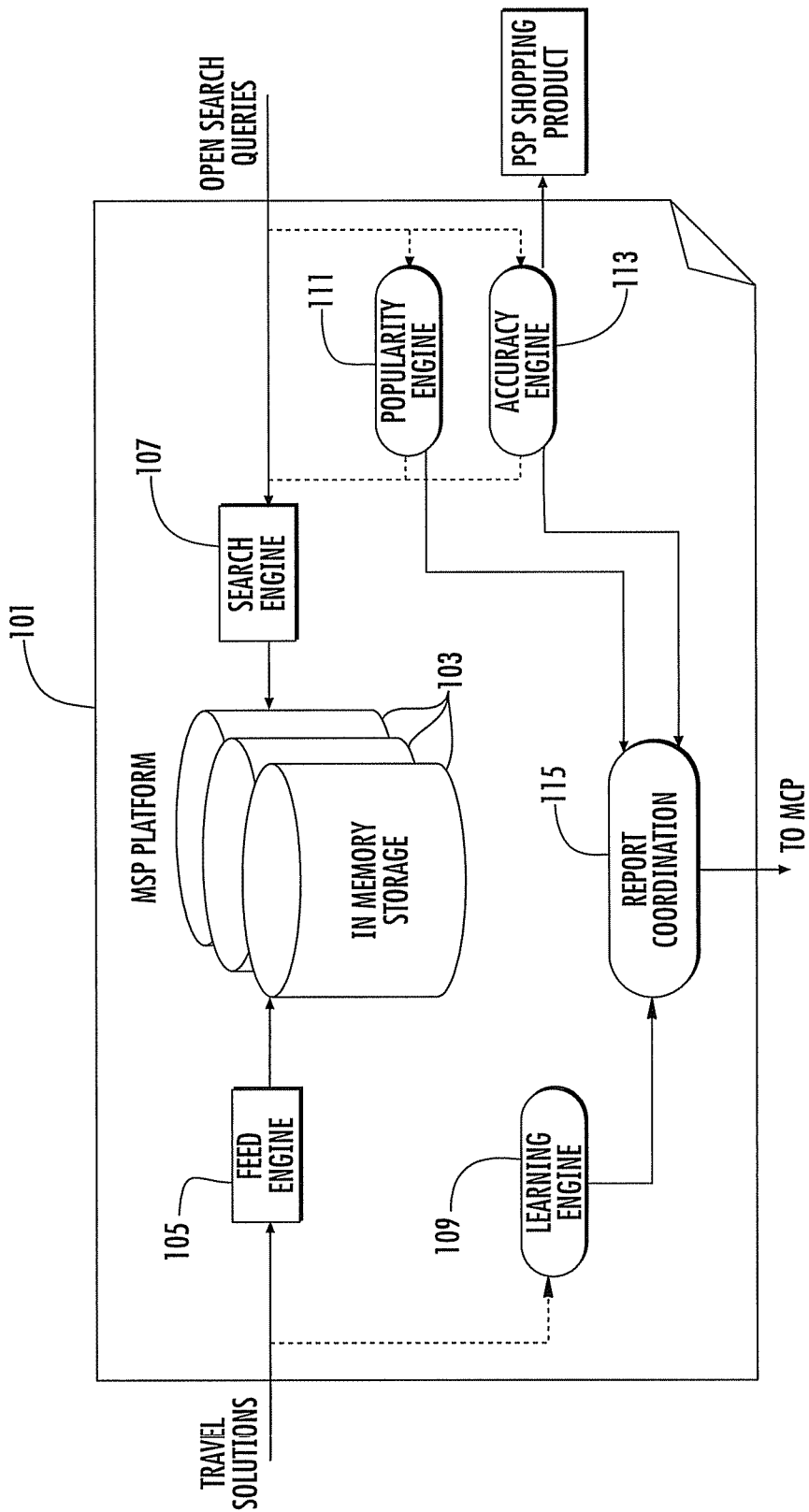
FIG. 1 is a diagram of the massive search platform for a pre-shopping reservation system in accordance with one embodiment of the present invention.

FIG. 1 shows a distributed system 101 for storing and searching air travel recommendations according to a preferred embodiment of the present invention. The stored catalogues or air travel recommendations are spread over all the machines which compose the distributed system. On every machine, the subpart of the global data is stored in a fast access memory location (e.g. RAM) for fast data access. FIG. 1 presents a logical view of the architecture of a system implementing the present invention. Although physically distributed, the logical view of the system can be split in two main groups:
  The data bases 103 and square boxes 105 and 107 represent the typical parts of a distributed search system.
  Databases 103 represent all the air travel recommendations logically grouped into pools of recommendations and physically stored across different machines The square boxes 105 and 107 represent the Feed and Search engines:
    The feed engine 105 indexes groups of pre-computed air travel recommendations (e.g. all travels with same city pair) and stores them in one of the machine in the distributed system.
    The search engine 107 locates groups of data among the physical machines and provides index search facilities to answer to queries originating from users.

The oval items 109-115 represent a series of business-oriented analysis engines. Their purpose is to optimize the hardware cost of the platform (and thus the cost for the travel providers): they aim at achieving a good compromise between the number of recommendations to re-compute every day vs. the accuracy of the pre-computed prices stored in the system. These engines analyze feed and search operations and generate metrics on volatility and quality of data stored in the system. Some of those engines make use of other shopping services of the GDS (not part of the invention). In particular:

- a learning engine 109 analyses the travel recommendations which are stored in the platform every day to extract some information about the volatility of some prices across dates and markets, i.e. how long a price stays the same; and
- a popularity engine 111 tracks the most requested or most returned travel recommendations, (per date, market . . . ) to gain metrics concerning the most relevant data stored in the system;
- an accuracy engine 113 tries to detect discrepancies between cached travel recommendations stored in the system and real shopping prices, i.e. flights which are no longer bookable or those whose prices have changed; and
- a report coordinator 115 aggregates and stores the results of the previous engines. Its role is to determine which part of the entire flights data must be recomputed given available resources and based on the results of the previous engines. Such determination is done according to an algorithm.

In the system, all the analysis engines work in parallel to Feed and Search Engines (105 and 107), so their work has no performance impact for the users (no response time degradation).

Figure 2:
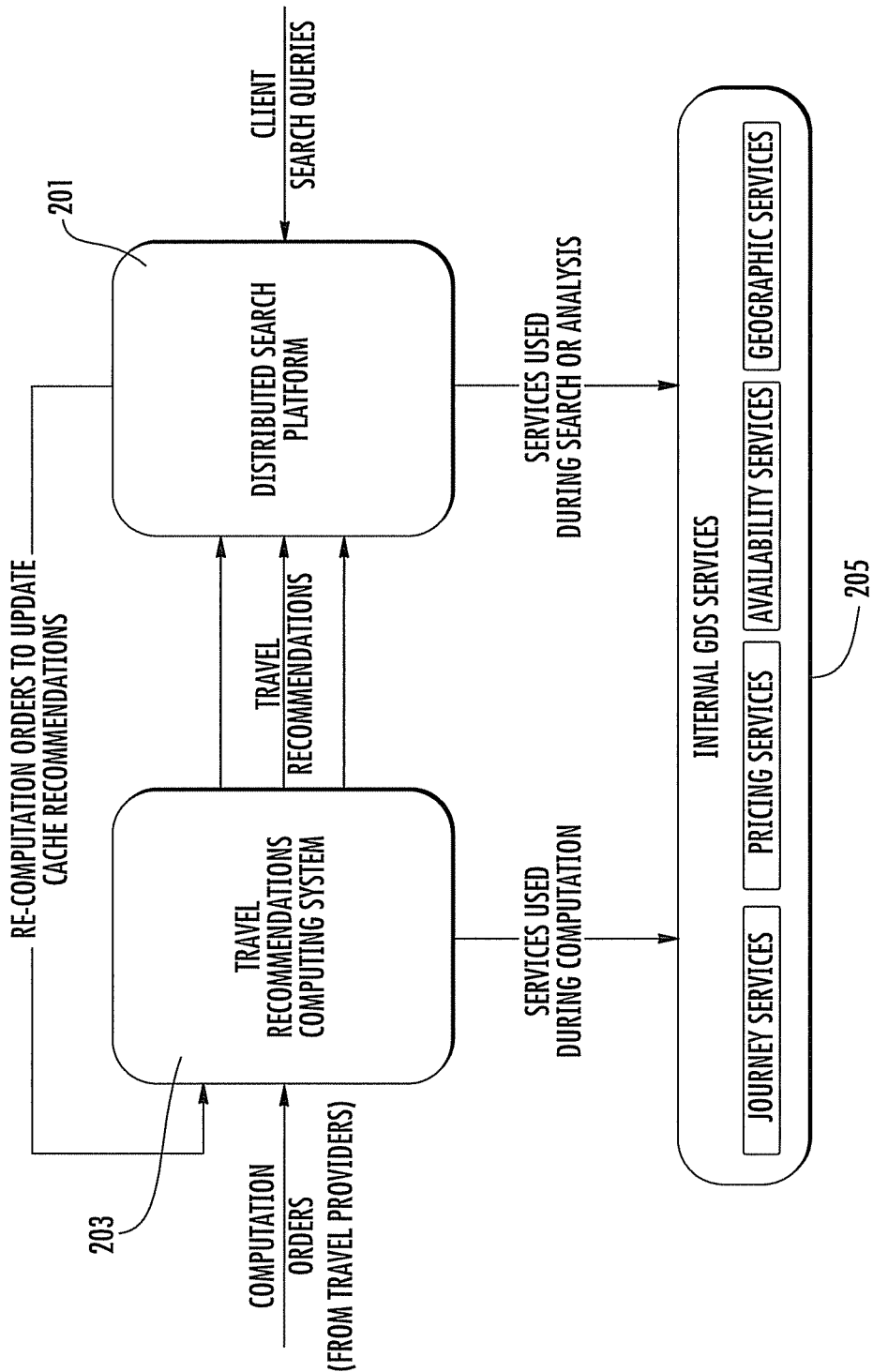
FIG. 2 shows a possible reservation system implementing the massive search platform of the present invention.

With reference to FIG. 2 a complete search platform is represented. Such platform includes a system 201 according to a preferred embodiment of the present invention as one of the component which is fed by a travel recommendations computing system 203, such as the one described in European Patent Application EP11305518.0 (in the following description we will refer to this system as Massive Computation Platform, or MCP). Both systems may interact with other internal services provided by a GDS 205.

FIG. 2 depicts the high level flow to follow in order to store entire catalogs of travel recommendation in the search platform.

As customers of the platform, the travel providers (airline, travel agency . . . ) decide which part of their travel domain they want to integrate into the search platform. From that point, they send to the travel recommendations computing system a so-called massive query that is a series of computation orders to the travel recommendations computing system. Those order details the markets to consider (e.g. a list of city pairs for all days of the year to come) as well as the travel recommendations to generate (e.g. for every day, the best recommendations for journeys between 1 and 20 days long). Such orders can be re-evaluated frequently by the customer or they can serve as a base for a recurring computation.

The travel recommendations computation system makes use of internal services of the GDS to compute the requested recommendations. Among other things, to generate a recommendation, it may use journey services to retrieve the list of existing flights; pricing services to find the best combination of fares and flights; availability services to consult the current seats available for booking . . . .

As the recommendations are generated, the computing system sends the results to the system according to a preferred embodiment of the present invention for integration. The received recommendations are stored in dedicated memory locations to populate a global cache of pre-computed travel recommendations, becoming available for eventual users' search queries. Once travel recommendations are integrated, some monitoring tasks take place in background to detect cached travel recommendations which must be recomputed due to a low consistency with equivalent shopping recommendations. This monitoring may use internal services provided by the GDS.

When inconsistent recommendations are detected, the system according to a preferred embodiment of the present invention generates a series of computation orders (massive queries) and sends them to the computing system. The latter will generate recent recommendations which will help in maintaining a good cache consistency.

Figure 3:
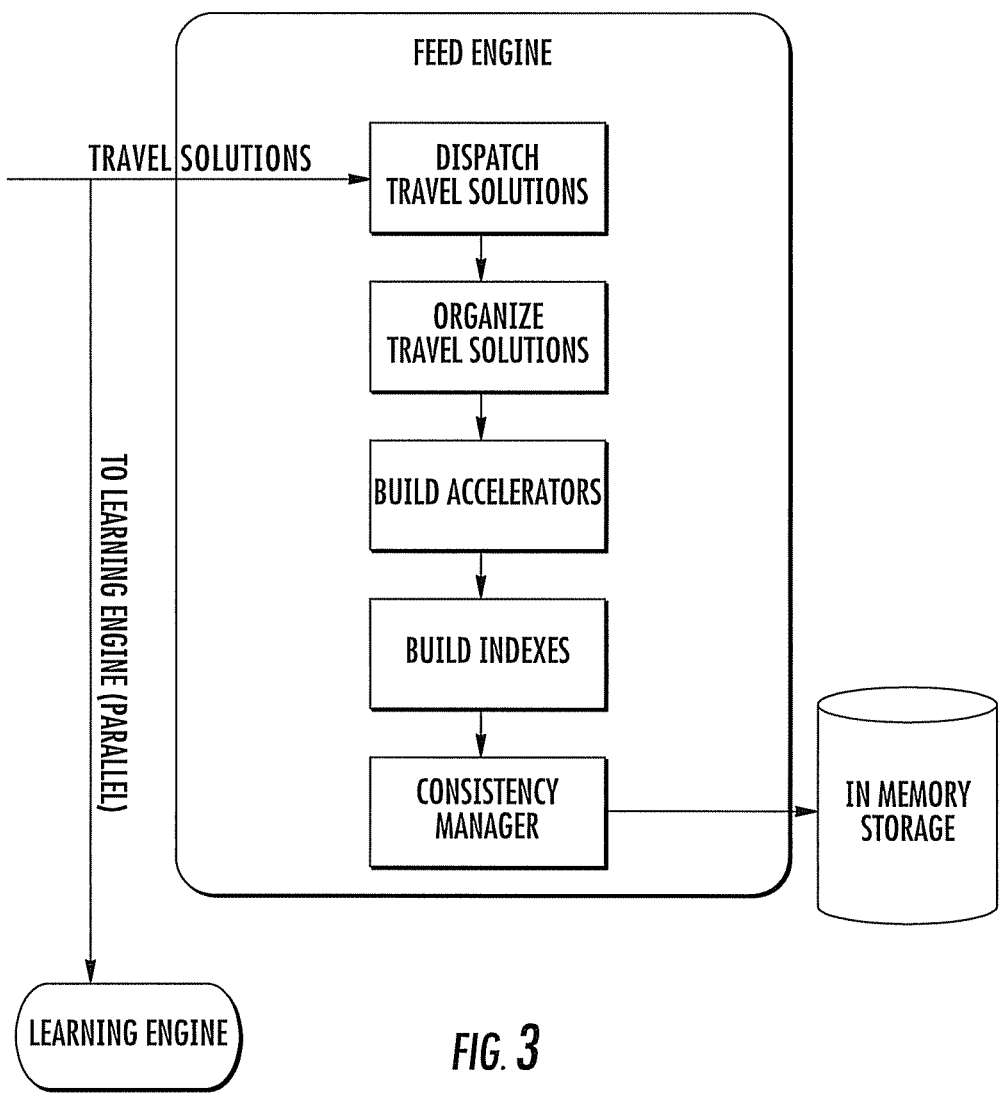
FIGS. 3-8 show the details of the single module components of the massive search platform for a pre-shopping reservation system in accordance with one embodiment of the present invention.

FIG. 3 represents the structure and the functions of the feed engine 105 (see FIG. 1). The feed engine receives groups of air travel recommendations returned by a travel recommendations computing system, e.g. MCP. For example, all prices from Paris to London (market PAR-LON). The integration of those data occurs in several steps:

Dispatch Travel Recommendations

In the system according to a preferred embodiment of the present invention, related data aims at being stored on the same physical machine to deliver very fast search response time. For example, two markets with the same origin city (PAR-LON and PAR-NYC) will land on the same physical machine.

The Feed engine extracts information from the group of recommendations (travel provider ID, office ID, market, geographic location . . . ) to determine the physical machine(s) which will host the data. This data balancing mechanism makes use of well known distributing techniques such as round robin, or consistent hashing. As seen in well known data replication schemes, many machines can host the same group of recommendations to improve reliability, fault-tolerance, or accessibility.

Organize Travel Recommendations

The feed engine receives batch of travel recommendations from a travel recommendations computing system, e.g. MCP. The incoming data are then grouped into what is called data sets, in a manner that suits better the system according to a preferred embodiment of the present invention. Each search product provided by the presently described system has a unique data organization strategy to optimize its performance. For the sake of the example, for a particular need a group of flights coming from the travel recommendations computing system, e.g. MCP, could be organized in groups of identical city pairs and then be assigned to two types of data sets: 1) same city pair and direct flights only; and 2) same city pair and flights with connections.

Build Accelerators

On top of that organization, the system according to a preferred embodiment of the present invention creates additional data sets that contain only meta-information about travel recommendations. These data help achieving very fast searches. For example, a data set of meta-information can host the cities reachable from an origin city and for each reachable city the cheapest price for city pair. Eventually, searches could benefit from this information to avoid looking at too many travel recommendations before returning solutions.

Build Indexes

Like databases, the system according to a preferred embodiment of the present invention constructs indexes on top of data sets to provide fast access time. For pre-computed air travel recommendations, the searches criterions are very open: one can search prices in a given range of date, for a given range of price, for arbitrary destination cities . . . . Instead of creating one index per search criteria, the system according to a preferred embodiment of the present invention uses a well known multi-dimensional data structure (the K-D-B-tree) to construct a single index per data set, while maintaining an equally efficient access to data whatever the search criteria. This approach limits the amount of storage used.

If two travel providers share common travel recommendations, and the fares are public (contrary to negotiated fares of travel providers, only applicable to specific office ID), those can be shared in the system storage to gain space and reduce hardware cost.

Consistency Manager

When new travel recommendations are available from the travel recommendations computing system, e.g. MCP, the equivalent data sets are updated with new or less travel recommendations, and their index is rebuilt. Concurrently, the impacted data sets may be searched for travel recommendations.

To prevent impacting on-going searches (both in term of performance and consistency), the feed engine manages revisions of data sets. While searches are being performed on revision n of a data set, a feed constructs revision n+1. When the revised data set is constructed and indexed it becomes the new reference data set for searches. The previous data set is deleted from the storage memories of all the physical machines in the distributed system which hosts the data set, shortly after. This ensures those data are kept available for on-going searches until they finish and thus prevent consistency issue.

Figure 4:
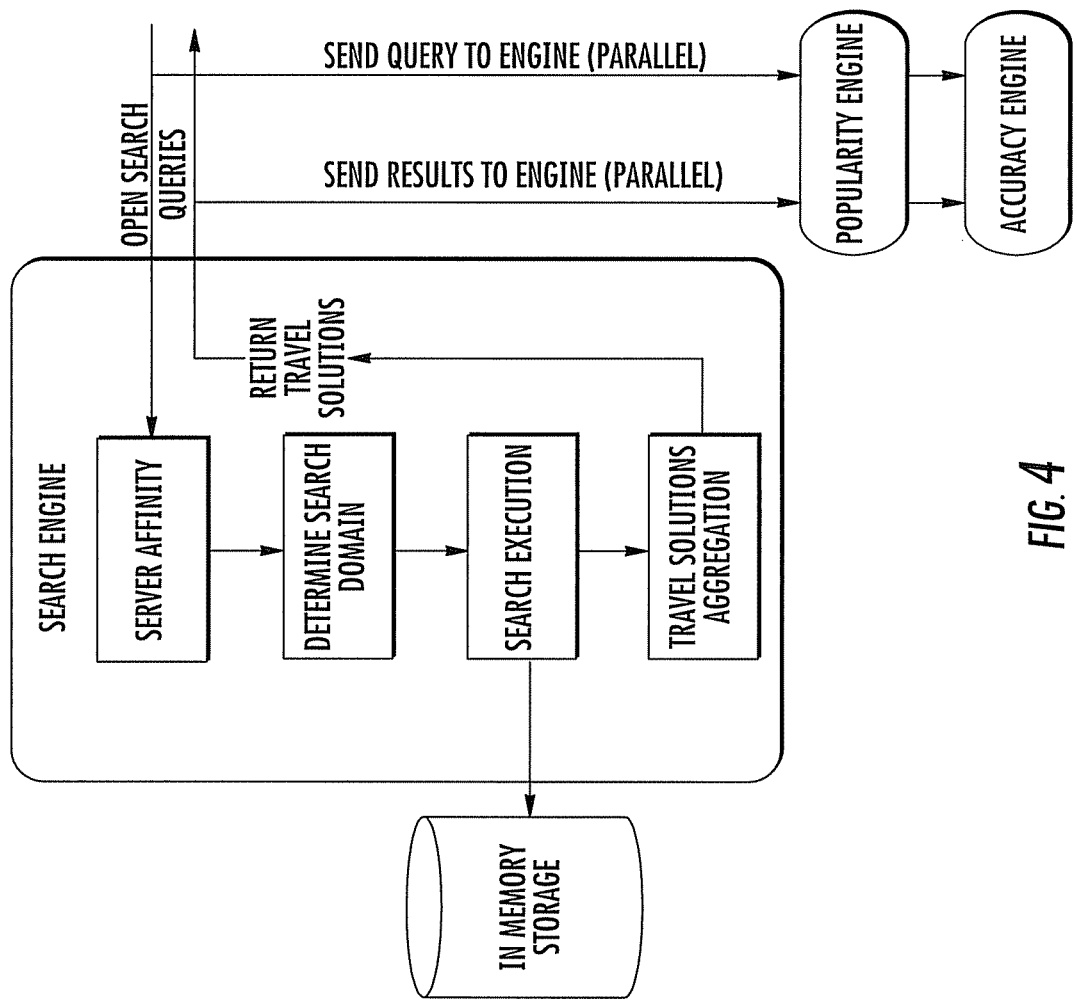

FIG. 4 represents the search engine 107 (see FIG. 1). The search engine receives air travel search requests from users and crawls into all the data to return the best recommendation. This process occurs in several steps:

Server Affinity

The incoming search request must be processed by a specific search product provided by the system according to a preferred embodiment of the present invention. From that point, it must be routed to a physical machine that contains the data necessary for answering the request. The air travel recommendations were dispatched by the feed engines to physical machines based on the specificities of the search product the recommendations were aimed at. The search engine performs the opposite operation: it analyses the search query to answer to, and based on its type it determines the data to search and the physical machine(s) where they are located.

Determine Search Domain

Once the search request is forwarded to the relevant physical machine, the search engine determines the data set where to find meta-information related to the search query. The meta-information is used to locate all the data sets of air travel recommendations which contain potential solutions to the search query.

Search Execution

Once all the potential air travel recommendation are located, the search engine parses all the multi-dimensional indexes to collect the best travel recommendations based on the criteria expressed in the search query, e.g., the price range, the date range, the flight carrier etc.

The search engine can take advantage of the previous meta-information to decide not to search into all potential travel solutions. For the sake of the example, suppose the search query asked for the best price departing from a specific city NCE. Suppose during the search a travel for destination city PAR was found for 100 euro. If the meta-information states that the lowest prices for city NYC is 500 euro, the search engine will not even try to search solutions from NCE to NYC. This further decreases the response time of the search transaction.

Related Searches

In case the search execution step returned no travel recommendations, the user's query may be too restrictive: the reasons for the lack of match are thus analyzed for each city pair previously considered. As an example, reasons may be that no flight exists in the specified date range, or flights exist but are more expensive than the limit expressed in the query.

In case the user's query is too restrictive, the search engine implements a fallback strategy to return recommendations which relates closely to the constraints expressed in the original query. It relaxes the constraints on the plurality of parameters (wider date range, higher price limit . . . ) and loops back to a search execution step. The loop ends either when some recommendations are found, when a configured number of retry is reached or when a maximum allowed time for retry is reached.

In case the fallback strategy does not return any recommendation, another fallback strategy is implemented when applicable. In case the requested destination has a geographic meaning (e.g., city, country), the search engine uses the geographic services provided by the GDS (not part of the invention) to determine close geographic regions, it widens the destination constraints of the original query and loops back to the search execution step, in the manner explained above.

If both fallback strategies fail to retrieve recommendations, an empty result is returned.

Travel Solutions Aggregation

Once all solutions to the search query are found, the search engine performs a pass to merge identical results which could have been returned from different data sets. This case can arise for example if the search had to look into a data set containing the cheapest direct flights for a city pair, and in another data set containing all flights (direct and with stop).

At last, the found travel solutions are organized based requirements of the search query: group solutions by destination city, by date, by ascending price, by airline (either direct or with connections). The result is then returned to the user.

Figure 5:
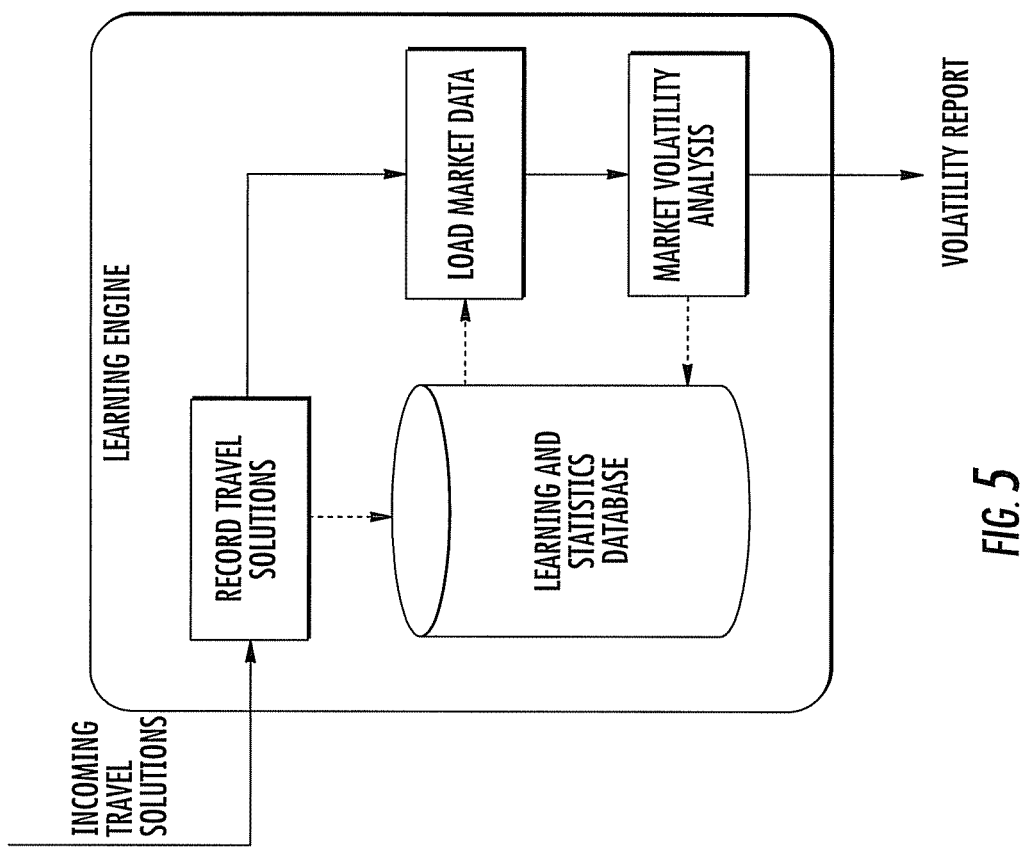

FIG. 5 shows the learning engine 109 (see FIG. 1). Learning engine includes a learning and statistics database. The purpose of the learning engine is to detect the air travels whose prices do not change frequently and thus which do not need frequent re-computation to stay accurate.

The learning engine bases its logical analysis on a general property of air travel flights: the price of a flight scheduled in the coming days is very volatile, i.e., if the same flight (same departure date) is priced again a day after, its price has likely changed. On the contrary, the price of a flight scheduled several months away is unlikely to change if it is price again a day after or a week after.

The learning engine associates a volatility model to each market based on the property detailed above. It maintains the volatility model (and rectifies it if needed) based on the travel recommendation it receives every day.

Record Price of Travel Recommendations

When incoming travel recommendations are received, they are duplicated and one copy goes to the learning engine. Travel recommendations are grouped by market, i.e., recommendations for travels for one city pair, for days of the coming year. Note that not all days of the year yield recommendations, because the system might instruct the travel recommendations computing system (e.g. MCP) to recompute only volatile flights across small range of dates.

The learning engine extracts the prices of the incoming travel recommendations and record them in a dedicated learning database, along with their date of computation. Those prices serve as a basis for price comparison for future air travel data integrations.

Load Market Data and Rectify Volatility Model

The learning engine loads all the prices previously stored in his dedicated database for the incoming market. It compares the saved prices with the incoming prices available.

The learning engine adapts the volatility model for the market depending of the outcome of prices comparison:

When two identical flights have different prices, the difference is stored as a statistics in the learning database. When differences occur too frequently, the volatility model is updated: the span date range is marked more volatile. Storing statistics about change frequency helps mitigate the effect of price changes due to punctual events, like holidays season.

If two identical flights have the same price for a longer period than what is expected based on the model, the model is also updated: the span date range is marked as less volatile.

Generate Volatility Reports

Once the analysis of all the incoming travel recommendations is finished, the learning engine generates a report which contains the revised volatility of the data which have just been integrated in the distributed search platform described herein. A volatility report is generated per customer ID (provider of the data) and is organized per market, per departure date.

The generated reports are sent to another engine called the report coordinator. The latter will eventually use this source of information to decide of the subset of the air travel recommendations which must be recomputed depending on the available computing resource on the travel recommendations computing system (e.g. MCP).

Figure 6:
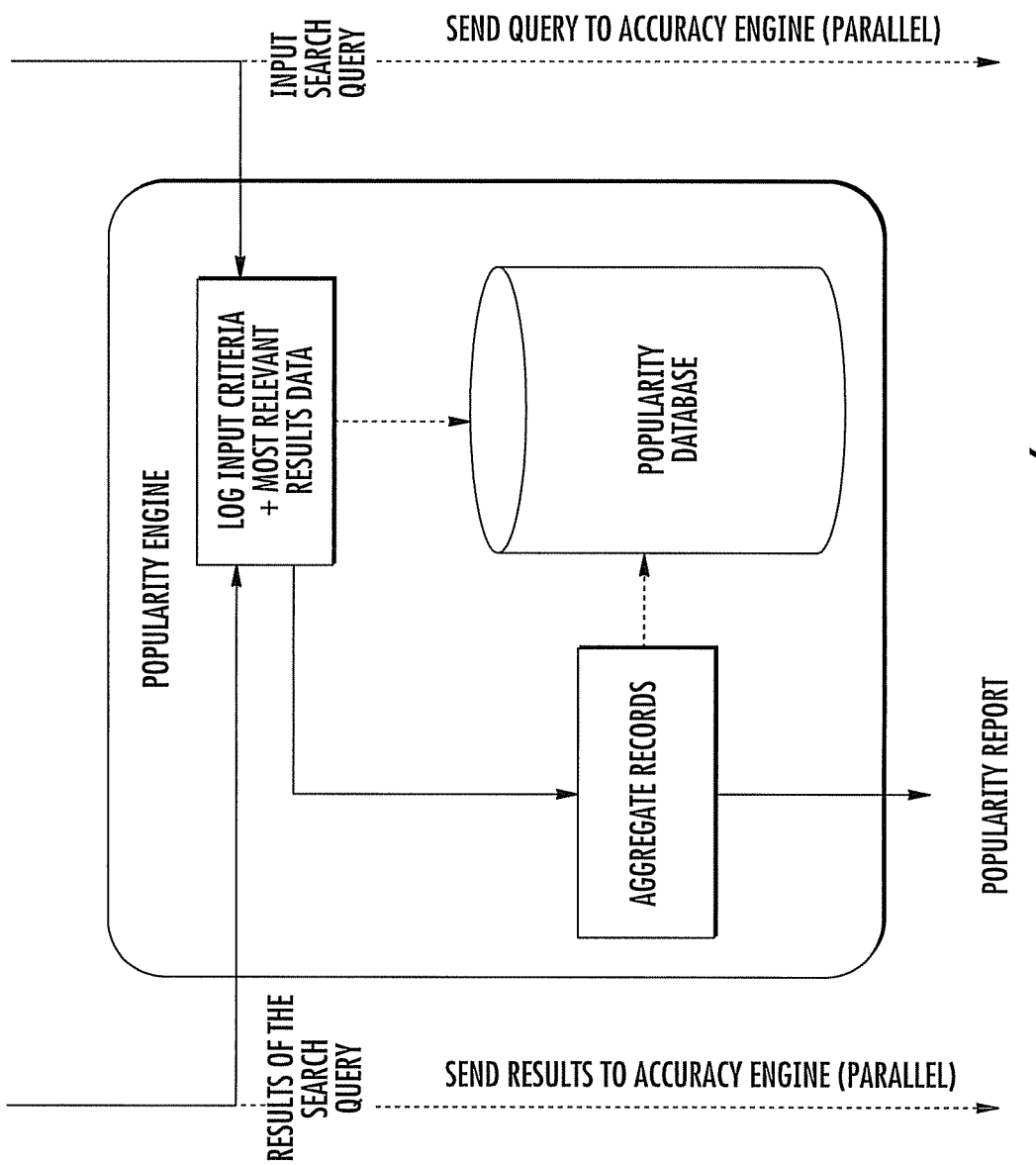

FIG. 6 shows the popularity engine 111 (see FIG. 1). Popularity engine includes a popularity database. On incoming search requests, the popularity engine gets a chance to extract search trends out of users transactions. This gives insights about the popularity of travel prices stored in the system. The analysis is performed in steps:

Input and Output Analysis

Before reaching the search engine, the input search query is duplicated and one copy goes into the popularity engine. Symmetrically, the output of the search transaction is duplicated before being sent back to the user and a copy goes to the popularity engine.

The popularity engine analyses both input and output of a transaction to gain some popularity metrics. The analysis yields different information depending on the criteria of the input search query. For example:

If the search query requested travel recommendations for a specific market (city pair), the engine can extract from the query a ranking on popular departure dates per market.

If the search query requested travel recommendations from a single origin city, the engine can extract from the solution a ranking on preferred destination cities (or destination countries) per originating city and per price, date range . . . .

Storing Statistics in Database

The trends extracted from the input query and output solutions are stored on a dedicated popularity database. This storage is by nature distributed, so that any physical machine (where the popularity engine operates) can benefit from the data produced on other physical machines of the system.

Aggregate Records and Generate Popularity Reports

In parallel, a recurring job of the popularity engine is to extract the statistics previously computed from the distributed database and to build some systemic popularity metrics.

For example, based on the total number of search queries that were analyzed for popularity, extract a ranking of popular markets, i.e., markets which were most targeted by input queries, cheaper markets returned in output travel solutions . . . . Another possibility is to generate statistics about most popular market for given date ranges throughout the year, to extract trends for specific events like holiday season or generate statistics about most popular markets for different geographic zones in the world. This refinement helps extract more relevant popularity measures (e.g., on domestic flights . . . . )

The generated reports are then sent to the report coordinator to give him access to popularity metrics.

Figure 7:
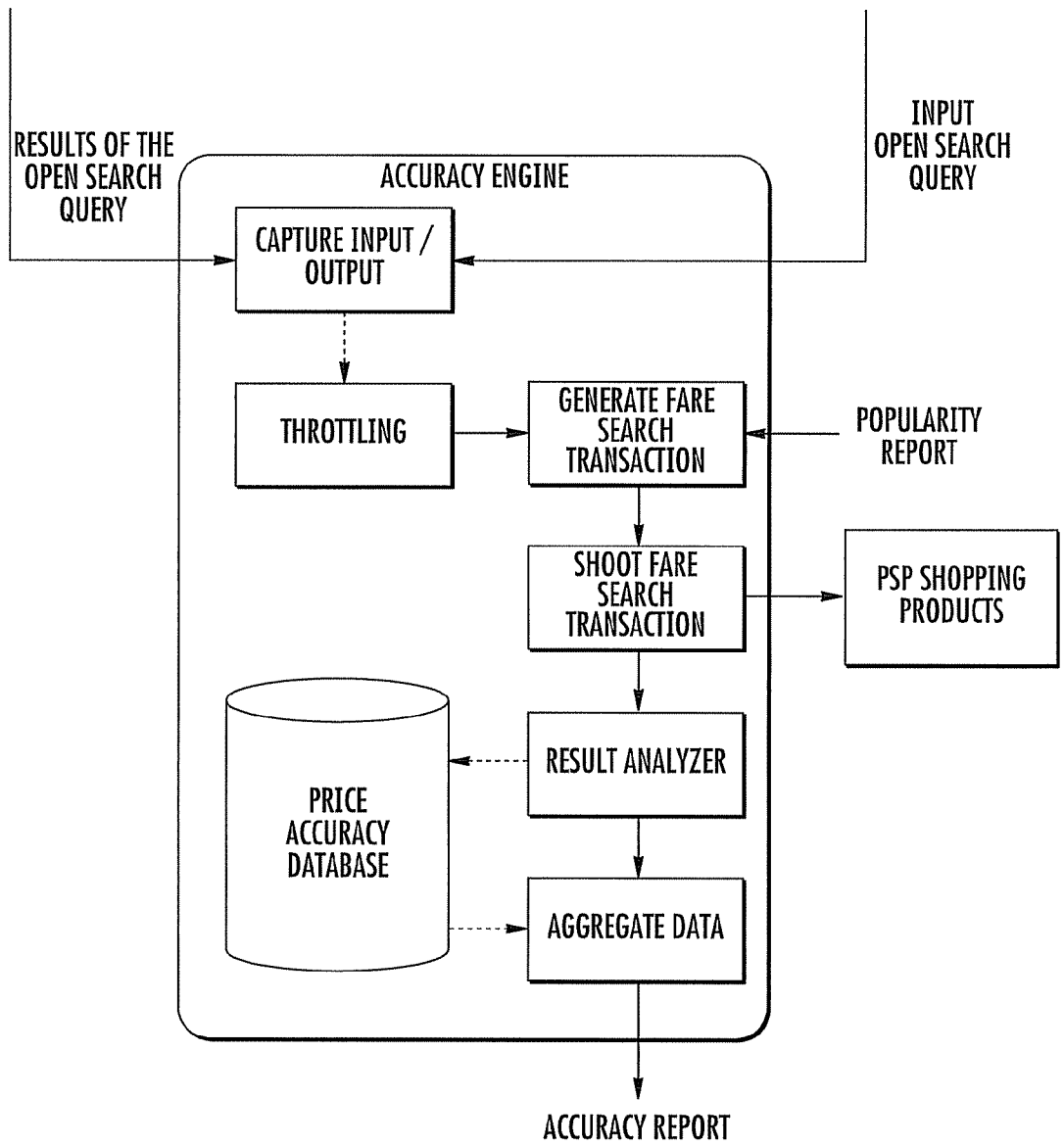

FIG. 7 shows the accuracy engine 113 (see FIG. 1). Accuracy engine 113 includes a price accuracy database.

The goal of the accuracy engine is to control pre-computed air travel recommendations and detect those whose price diverges too much from the real (i.e., current) shopping price. The principle of the engine is to use external Amadeus shopping services (not part of the invention) to shoot shopping transactions and to compare the returned prices with that of the cache of travel recommendations.

This engine operates in several steps.

Use Input and Output Transactions, with Throttling

Like for the popularity engine, the accuracy engine receives a copy of the duplicated input search query and output travel solutions.

To avoid shooting too many real shopping transactions, which are expensive in hardware cost and in response time, a throttling pass is applied to operate on a subset of the natural traffic that goes through the distributed search platform described herein.

Generate Fare Search Transactions

One must ensure that the accuracy engine will generate fare search transactions which are diversified enough to analyze a representative subset of the travel recommendations stored in the system. To do so, the generation strategy is twofold:

Generate fare search transactions based on travel popularity: the accuracy engine accesses the popularity database (presented earlier) to analyze the popularity of output solutions and keep only the most popular ones for further analysis. This maximizes the consistency experienced by users regarding cached prices vs. real shopping prices.

Generate random transactions based on the contents of the cache of travel recommendations. A random election of travels for analysis aims at providing eventual accuracy of the entire cache of travel recommendations. It ensures good travel findability for the users, i.e., accuracy of unpopular flights is also monitored, though less often to limit hardware cost.

Aggregate Data

The gathered accuracy metrics are stored in a dedicated, distributed accuracy database. A recurring job consolidates all the accuracy metrics into several reports (accuracy of solutions by customer, by market, by departure date . . . ) and sends them to the report coordinator for further usage.

Figure 8:
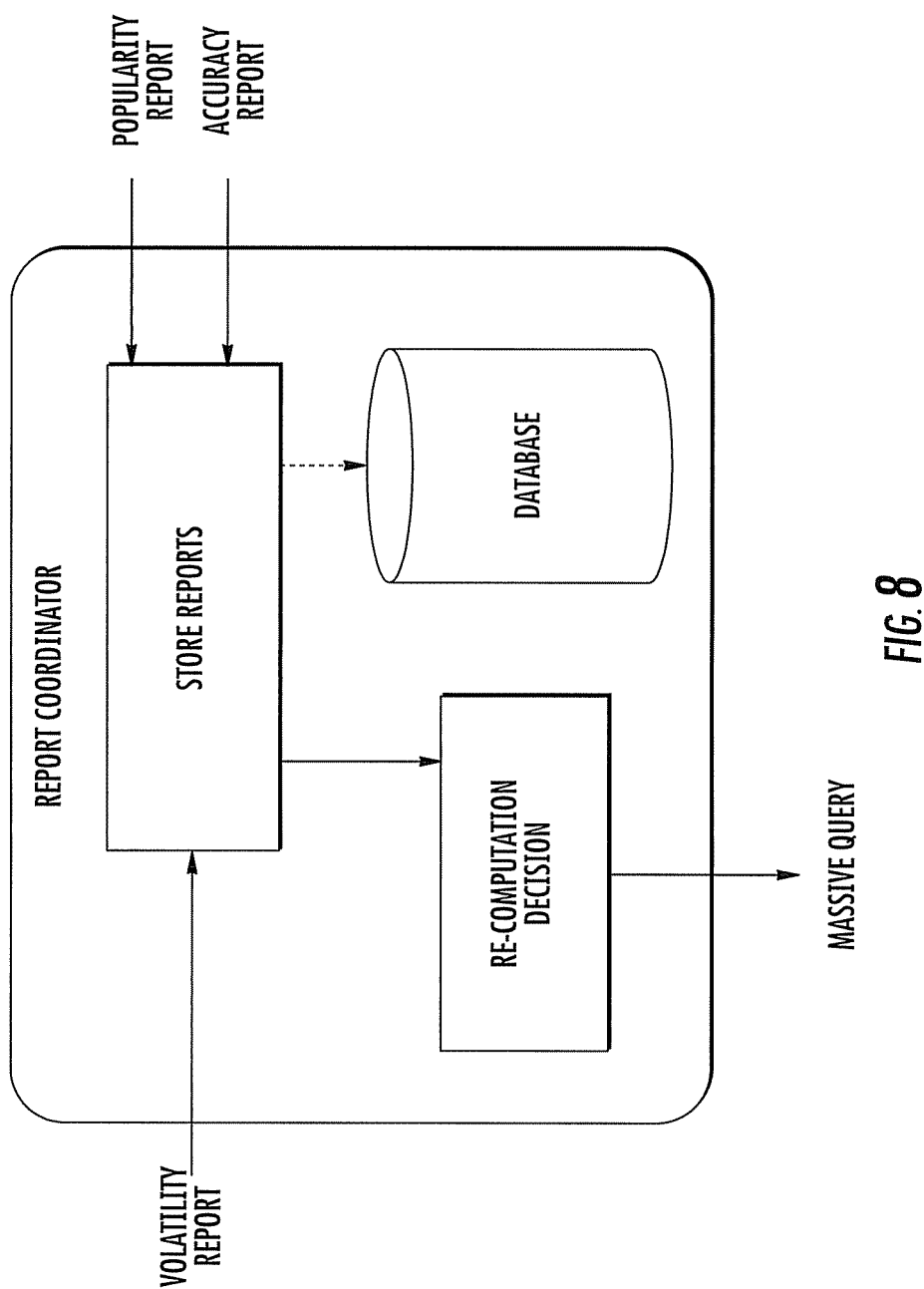

FIG. 8 shows the report coordinator 115 (see FIG. 1). The report coordinator is the last business analysis engine of the system according to a preferred embodiment of the present invention. Its role is to decide which part of the data in the platform must be re-computed, based on all the metrics reported by the previous engines and according to the available computing resource on the travel recommendations computing system (e.g. MCP).

The decision of re-computation is performed in several steps.

Store Reports

All the metrics from the incoming volatility, popularity and accuracy reports are stored locally in a dedicated report database. This storage is necessary because the report coordinator takes its decision based on previous metrics. For example, the report coordinator infers the age of data stored in the cache of travel recommendations based on the volatility reports. This information is then kept in the report database.

Re-Computation Decision

The decisions made by report coordinator are based on heuristics to balance data accuracy of the cache vs. computation resource on the computing system (e.g. MCP).

The basic approach is to re-compute the least accurate cached travel recommendations, given the available resource on the computing system (e.g. MCP). Among the least accurate data, the most popular ones are considered first for the generation of a re-computation order.

The candidates for re-computation are selected by the report coordinator in order to form groups of nearby travels in the flights domains (close date range for each market). This allows the travel recommendations computing system to mutualise some re-computations and further optimize its resource consumption.

Between each re-computation order, the report coordinator makes use of the volatility models (stored in the report database) and the inferred age of the travel recommendations to update the forecast accuracy of all the remaining data in the MSP.

Figure 9:
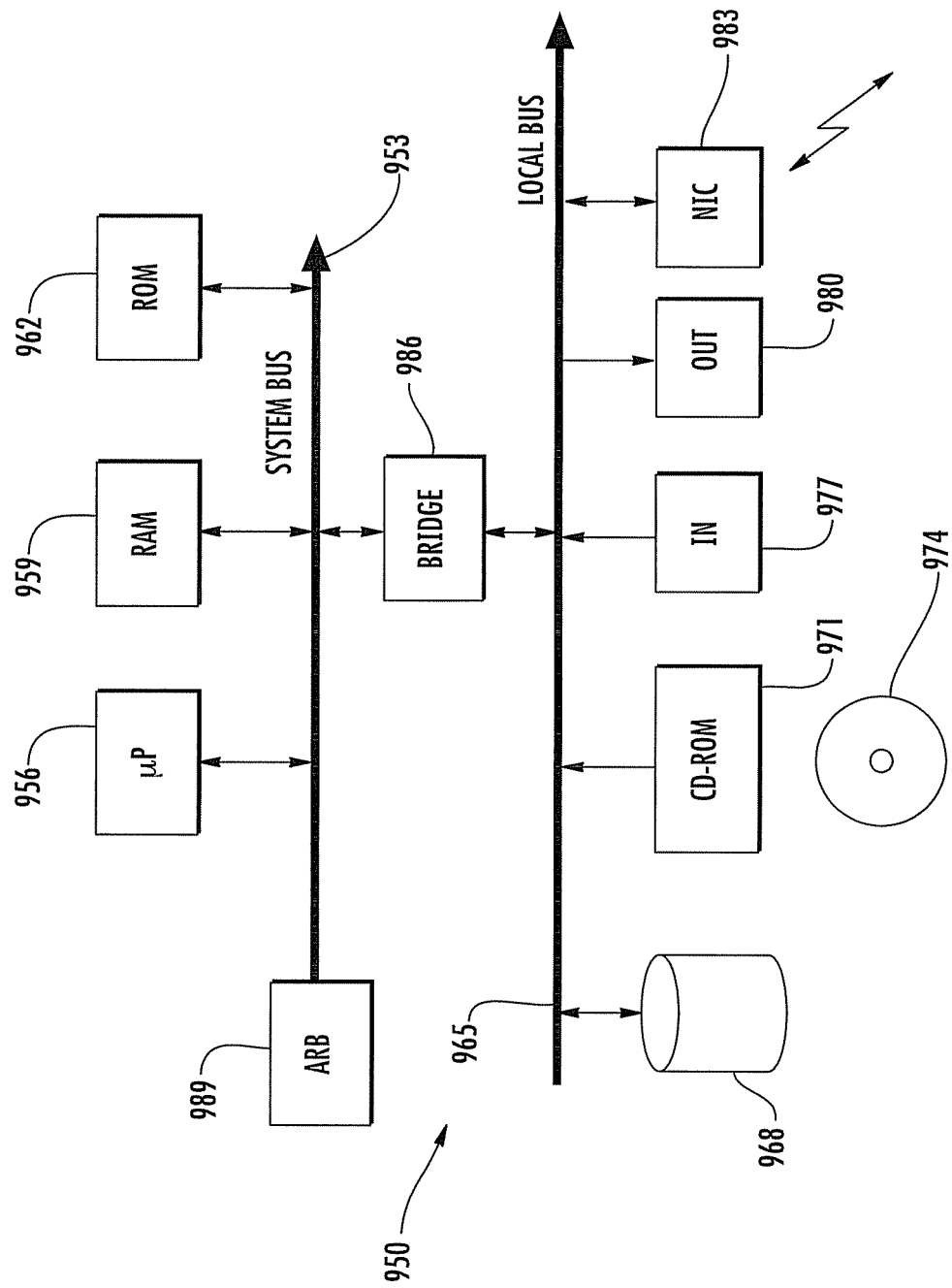
FIG. 9 is a diagram of a general computer system adapted to support the method of a preferred embodiment of the present invention.

With reference to FIG. 9 a generic computer of the system (e.g. computer, reservation server, data base management subsystem, router, network server) is denoted with 950. The computer 950 is formed by several units that are connected in parallel to a system bus 953. In detail, one or more microprocessors 956 control operation of the computer 950; a RAM 959 is directly used as a working memory by the microprocessors 956, and a ROM 962 stores basic code for a bootstrap of the computer 950. Peripheral units are clustered around a local bus 965 (by means of respective interfaces). Particularly, a mass memory consists of a hard-disk 968 and a drive 971 for reading CD-ROMs 974. Moreover, the computer 950 includes input devices 977 (for example, a keyboard and a mouse), and output devices 980 (for example, a monitor and a printer). A network interface card 983 is used to connect the computer 950 to the network. A bridge unit 986 interfaces the system bus 953 with the local bus 965. Each microprocessor 956 and the bridge unit 986 can operate as master agents requesting an access to the system bus 953 for transmitting information. An arbiter 989 manages the granting of the access with mutual exclusion to the system bus 953. Similar considerations apply if the system has a different topology, or it is based on other networks. Alternatively, the computers have a different structure, include equivalent units, or consist of other data processing entities (such as PDAs, mobile phones, and the like).

Figure 10:
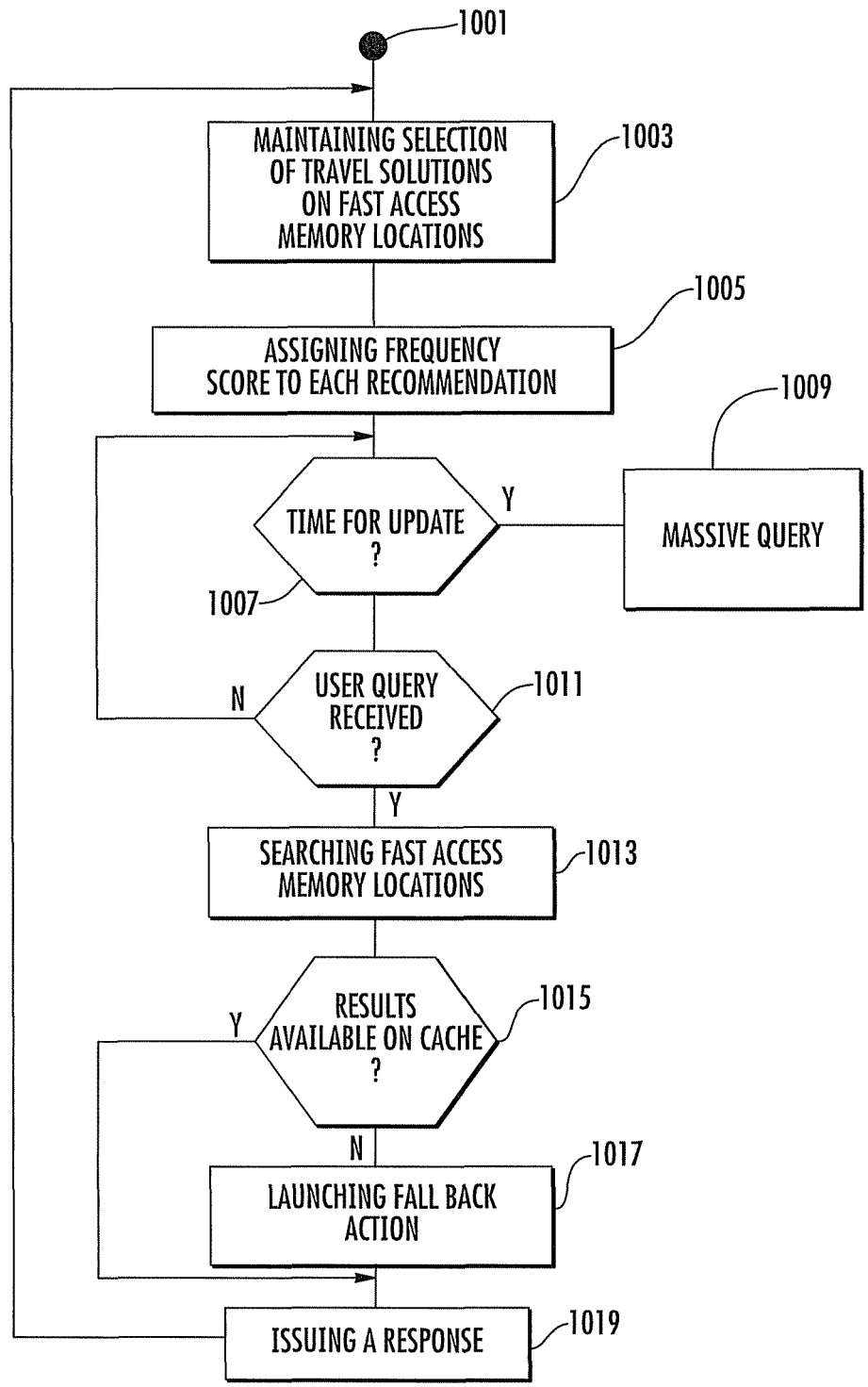
FIG. 10 is a flow chart of the method steps of a process, in accordance with one embodiment of the present invention.

The method described above is also represented in the diagram shown in FIG. 10. The method is a pre-shopping tool (i.e. for generating priced travel recommendations according to non-binding travel queries) which operates in a distributed reservation system having access to a plurality of travel databases containing information on travel availability and fares according to a plurality of parameters, each travel query including a set of preferences each preference being related to a parameter selected among the plurality of parameters. The distributed reservation system includes a plurality of fast access memory locations where a selection of travel recommendations is maintained so that users can have a fast response to their queries. We refer to these fast access memory with the term of "cache made of pre-computed travel recommendations" even if those skilled in the art will appreciate that this term is technically not completely appropriate because, as opposed to a cache, the contents stored in the fast access memories represent entire travel catalogues and not only a subset comprising of the most accessed travels of the catalogues. In other words, the term cache relates to "shopping transactions cache". Similarly, the information stored on those fast access memories are referred to as "cache information" (e.g. "cached travel recommendations"). The problem with the cache of pre-computed travel recommendations is that the data contained in the recommendations need to be updated in order for their price to keep consistent with the real prices found during shopping. This is a very costly (in term of time and system performances) activity and a balance must be found between consistency of information and system performances. One of the main features of the present invention is that the different travel recommendations are not updated at the same time and with the same frequency; rather a "frequency" score is assigned to each travel recommendation, according to which the update is scheduled: the information which is likely to be more volatile will be refreshed more frequently. The method begins at black circle 1001 and then goes to box 1003 where the system maintains a cache made of a selection of pre-computed travel recommendations on a plurality of fast access memory locations, each travel recommendation including information on fares and/or availability for a specific travel, sorted by at least one of the plurality of parameters. The sorting and indexing of the cached travel recommendations can be done in several ways as explained above: this is important to identify the right information in the shortest time possible. A score indicative of a needed refresh frequency is then assigned to each of the cached travel recommendations (step 1005). This score will be used to determine when a refresh of the information should be made. The refresh (step 1009) according to a preferred embodiment of the present invention is done with a batch processing as explained above: in a preferred embodiment of the present invention a massive query is launched through a dedicated subsystem, e.g. a dedicated travel recommendations computing system as for example the Massive Computation Platform mentioned above. The launching of such massive query (step 1007) can be done at fixed time or invoked by a user or being triggered by specific events for example the massive query could be done every pre-determined period of time (e.g. at the end of day or every hour); it could be automatically performed when a critical mass of queries is received or when the maximum capacity is reached; or again it could be requested by the administrator of the system or by the travel providers. When a user query is received (step 1011) the system, tries first the search within the fast access memory locations (1013). If no solution is found (step 1015) then an optional fall-back action could be launched (step 1017): if no fall-back action is provided a message to the user will advise that no results are available in the system. Alternatively a new search could be launched with adjusted parameters, considering that the user's query may be too restrictive: the reasons for the lack of match are thus analyzed for each city pair previously considered. As an example, reasons may be that no flight exists in the specified date range, or flights exists but are more expensive than the limit expressed in the query.

In case the user's query is too restrictive, the search engine implements a fallback strategy to return recommendations which relates closely to the constraints expressed in the original query. It relaxes the constraints on the plurality of parameters (wider date range, higher price limit . . . ) and loops back to a search execution step. The loop ends either when some recommendations are found, when a configured number of retry is reached or when a maximum allowed time for retry is reached. In case the fallback strategy does not return any recommendation, another fallback strategy is implemented when applicable. In case the requested destination has a geographic meaning (e.g., city, country), the search engine uses the geographic services provided by the GDS (not part of the invention) to determine close geographic regions, it widens the destination constraints in of the original query and loops back to the search execution step, in the manner explained above. If both fallback strategies fail to retrieve recommendations, an empty result is returned. Yet another possible solution would be to launch a query to external databases to find the requested travel recommendation and to enrich the cache of pre-computed travel recommendations. If a result is obtained the cache of pre-computed travel recommendations will be enriched with this new information. In any case a response is issued to the user (step 1019). The score of the travel recommendations might need an update as well. In the embodiment described herein the queries are sent by users looking for pre-shopping information, i.e. information on e.g. trip availability, fares, time or general information not necessarily aimed at completing a reservation. In a preferred embodiment of the present invention the system receiving the queries and performing the database enquiries for satisfying user queries is separate from the actual reservation system, but those skilled in the art will appreciate that the two systems (pre-shopping and reservation) could be integrated together.

It will be appreciated that alterations and modifications may be made to the above without departing from the scope of the disclosure. Naturally, in order to satisfy local and specific requirements, a person skilled in the art may apply to the solution described above many modifications and alterations. Particularly, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a general matter of design choice.

Similar considerations apply if the program (which may be used to implement each embodiment of the disclosure) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibres, wireless connections, networks, broadcast waves, and the like; for example, the medium may be of the electronic, magnetic, optical, electromagnetic, infrared, or semiconductor type.

In any case, the solution according to the present disclosure lends itself to be carried out with a hardware structure (for example, integrated in a chip of semiconductor material), or with a combination of software and hardware.

The invention claimed is:

1. A computer program product comprising:

a non-transitory computer readable medium; and program code stored on the computer readable storage medium that, when executed by a processor, causes the processor to:

store a plurality of pre-computed travel recommendations in a fast access memory of the computer, each pre-computed travel recommendation comprising a price of the travel recommendation;

assign a score to each pre-computed travel recommendation, the score indicative of a frequency with which the corresponding pre-computed travel recommendation is re-computed;

select one or more of the plurality of pre-computed travel recommendations for re-computing based on the assigned scores;

launch a query in the plurality of travel databases to obtain data relating to the selected pre-computed travel recommendations;

re-compute the selected pre-computed travel recommendations based on the data obtained by the query;

determine a frequency with which the price of the selected pre-computed travel recommendations changes over a first span of dates including a punctual event;

determine the frequency with which the price of the selected pre-computed travel recommendations changes over a second span of dates not including the punctual event;

adjust the score of the selected pre-computed travel recommendations based on whether the current date falls in the first span or the second span of dates;

in response to receiving the travel query, search within the plurality of pre-computed travel recommendations in the fast access memory of the computer for travel recommendations that satisfy the parameters included in the travel query; and issue a response to the user for the travel query, the response including the pre-computed travel recommendations satisfying the parameters included in the travel query.

2. A method for providing priced travel recommendations according to a travel query from a user, the travel query received by a computer having one or more processors and access to a plurality of travel databases, the travel query including one or more parameters, the method comprising:

storing a plurality of pre-computed travel recommendations in a fast access memory of the computer by at least one of the processors, each pre-computed travel recommendation comprising a price of the travel recommendation;

assigning a score to each pre-computed travel recommendation by at least one of the processors, the score indicative of a frequency with which the corresponding pre-computed travel recommendation is re-computed;

determining a frequency with which the price of the corresponding pre-computed travel recommendation changes over a first span of dates including a punctual event;

determining a frequency with which the price of the corresponding pre-computed travel recommendation changes over a second span of dates not including the punctual event;

adjusting the score of the corresponding pre-computed travel recommendation based on whether the current date falls in the first span or the second span of dates;

selecting one or more of the plurality of pre-computed travel recommendations for recomputation by at least one of the processors based on the assigned scores;

launching a query in the plurality of travel databases by at least one of the processors to obtain data relating to the selected pre-computed travel recommendations;

re-computing the selected pre-computed travel recommendations by at least one of the processors based on the data obtained by the query;

in response to receiving the travel query, searching by at least one of the processors within the plurality of pre-computed travel recommendations in the fast access memory of the computer for travel recommendations that satisfy the parameters included in the travel query; and issuing a response to the user by at least one of the one or more processors, the response including one or more of the pre-computed travel recommendations satisfying the parameters included in the travel query.

3. The method of claim 2 wherein the score indicative of the frequency with which the corresponding pre-computed travel recommendation is re-computed is based at least in part on a value indicative of a volatility of the price of the travel recommendation.

4. The method of claim 2 wherein the score indicative of the frequency with which the corresponding pre-computed recommendation is re-computed includes a value indicative of a popularity of the travel recommendation.

5. The method of claim 2 wherein launching the query in the plurality of travel databases and re-computing the selected pre-computed travel recommendations is done by a dedicated sub-system.

6. The method of claim 2 further comprising:
dividing the plurality of pre-computed travel recommendations into a plurality of homogeneous groups, each pre-computed travel recommendation in a homogeneous group having at least one parameter with the same value, and storing each group in one of a plurality of fast access memory locations.

7. The method of claim 2 wherein launching the query in the plurality of travel databases to obtain data relating to the selected pre-computed travel recommendations is done at a predetermined time interval.

8. The method of claim 2 wherein the query in the plurality of travel databases to obtain data relating to the selected pre-computed travel recommendations is done with a batch process.

9. The method of claim 2 further comprising:
indexing the plurality of pre-computed travel recommendations according to a multi-dimensional data structure.

10. The method of claim 2 further comprising:
in response to none of the pre-computed travel recommendations satisfying the parameters included in the travel query received from the user, searching within the plurality of pre-computed travel recommendations for travel recommendations that satisfy a travel query with relaxed constraints on one or more of the parameters included in the user travel query.

11. The method of claim 2 further comprising:
in response to none of the pre-computed travel recommendations satisfying the parameters included in the travel query received from the user, issuing an alert message to the user.

12. A method for providing priced travel recommendations according to a travel query from a user, the travel query received by a computer having one or more processors and access to a plurality of travel databases, the travel query including one or more parameters, the method comprising:

storing a plurality of pre-computed travel recommendations in a fast access memory of the computer by at least one of the processors, each pre-computed travel recommendation comprising a price of the travel recommendation;

assigning a score to each pre-computed travel recommendation by at least one of the processors, wherein the score is indicative of a frequency with which the corresponding pre-computed travel recommendation is re-computed, and wherein the score indicative of the frequency with which the corresponding pre-computed travel recommendation is re-computed is based at least in part on a value indicative of a volatility of the price of the travel recommendation;

determining the volatility of the price of the corresponding pre-computed travel recommendation by comparing a price previously stored for the pre-computed travel recommendation to the price for the re-computed travel recommendation, and adjusting the volatility of the price of the corresponding pre-computed travel recommendation based on a difference between the stored and re-computed prices;

selecting one or more of the plurality of pre-computed travel recommendations for recomputation by at least one of the processors based on the assigned scores;

launching a query in the plurality of travel databases by at least one of the processors to obtain data relating to the selected pre-computed travel recommendations;

re-computing the selected pre-computed travel recommendations by at least one of the processors based on the data obtained by the query;

in response to receiving the travel query, searching by at least one of the processors within the plurality of pre-computed travel recommendations in the fast access memory of the computer for travel recommendations that satisfy the parameters included in the travel query; and issuing a response to the user by at least one of the one or more processors, the response including one or more of the pre-computed travel recommendations satisfying the parameters included in the travel query.

13. The method of claim 12 wherein the score indicative of the frequency with which the corresponding pre-computed recommendation is re-computed includes a value indicative of a popularity of the travel recommendation.

14. The method of claim 12 wherein launching the query in the plurality of travel databases and re-computing the selected pre-computed travel recommendations is done by a dedicated sub-system.

15. The method of claim 12 further comprising:
dividing the plurality of pre-computed travel recommendations into a plurality of homogeneous groups, each pre-computed travel recommendation in a homogeneous group having at least one parameter with the same value, and storing each group in one of a plurality of fast access memory locations.

16. The method of claim 12 wherein launching the query in the plurality of travel databases to obtain data relating to the selected pre-computed travel recommendations is done at a predetermined time interval.

17. The method of claim 12 wherein the query in the plurality of travel databases to obtain data relating to the selected pre-computed travel recommendations is done with a batch process.

18. The method of claim 12 further comprising:
indexing the plurality of pre-computed travel recommendations according to a multi-dimensional data structure.

19. The method of claim 12 further comprising:
in response to none of the pre-computed travel recommendations satisfying the parameters included in the travel query received from the user, searching within the plurality of pre-computed travel recommendations for travel recommendations that satisfy a travel query with relaxed constraints on one or more of the parameters included in the user travel query.

20. The method of claim 12 further comprising:
in response to none of the pre-computed travel recommendations satisfying the parameters included in the travel query received from the user, issuing an alert message to the user.

21. A data processing system comprising:
a processor; and
a memory coupled with the processor, the memory including instructions that, when executed by the processor, cause the processor to:
store a plurality of pre-computed travel recommendations in a fast access memory of the computer, each pre-computed travel recommendation comprising a price of the travel recommendation;
assign a score to each pre-computed travel recommendation, the score indicative of a frequency with which the corresponding pre-computed travel recommendation is re-computed;
select one or more of the plurality of pre-computed travel recommendations for recomputation based on the assigned scores;
launch a query in the plurality of travel databases to obtain data relating to the selected pre-computed travel recommendations;
re-compute the selected pre-computed travel recommendations based on the data obtained by the query;
determine a frequency with which the price of the selected pre-computed travel recommendations changes over a first span of dates including a punctual event;
determine the frequency with which the price of the selected pre-computed travel recommendations changes over a second span of dates not including the punctual event;
adjust the score of the selected pre-computed travel recommendations based on whether the current date falls in the first span or the second span of dates;
in response to receiving the travel query, search within the plurality of pre-computed travel recommendations in the fast access memory of the computer for travel recommendations that satisfy the parameters included in the travel query; and
issue a response to the user, the response including one or more of the pre-computed travel recommendations satisfying the parameters included in the travel query.

22. A computer program product comprising:
a non-transitory computer readable medium; and
program code stored on the computer readable storage medium that, when executed by a processor, causes the processor to:
store a plurality of pre-computed travel recommendations in a fast access memory of the computer, each pre-computed travel recommendation comprising a price of the travel recommendation;
assign a score to each pre-computed travel recommendation, wherein the score is indicative of a frequency with which the corresponding pre-computed travel recommendation is re-computed, and wherein the frequency with which the corresponding pre-computed travel recommendation is re-computed is based at least in part on a value indicative of a volatility of the price of the travel recommendation;
determine the volatility of the price of the corresponding pre-computed travel recommendation by comparing a price previously stored for the pre-computed travel recommendation to the price for the re-computed travel recommendation, and adjusting the volatility of the price of the corresponding pre-computed travel recommendation based on a difference between the stored and re-computed prices;
select one or more of the plurality of pre-computed travel recommendations for re-computing based on the assigned scores;
launch a query in the plurality of travel databases to obtain data relating to the selected pre-computed travel recommendations;
re-compute the selected pre-computed travel recommendations based on the data obtained by the query;
in response to receiving the travel query, search within the plurality of pre-computed travel recommendations in the fast access memory of the computer for travel recommendations that satisfy the parameters included in the travel query; and
issue a response to the user for the travel query, the response including the pre-computed travel recommendations satisfying the parameters included in the travel query.

23. A data processing system comprising:
a processor; and
a memory coupled with the processor, the memory including instructions that, when executed by the processor, cause the processor to:
store a plurality of pre-computed travel recommendations in a fast access memory of the computer, each pre-computed travel recommendation comprising a price of the travel recommendation;
assign a score to each pre-computed travel recommendation, wherein the score is indicative of a frequency with which the corresponding pre-computed travel recommendation is re-computed, and wherein the frequency with which the corresponding pre-computed travel recommendation is re-computed is based at least in part on a value indicative of a volatility of the price of the travel recommendation;
determine the volatility of the price of the corresponding pre-computed travel recommendation by comparing a price previously stored for the pre-computed travel recommendation to the price for the re-computed travel recommendation, and adjusting the volatility of the price of the corresponding pre-computed travel recommendation based on a difference between the stored and re-computed prices;
select one or more of the plurality of pre-computed travel recommendations for recomputation based on the assigned scores;

launch a query in the plurality of travel databases to obtain data relating to the selected pre-computed travel recommendations;
re-compute the selected pre-computed travel recommendations based on the data obtained by the query;
in response to receiving the travel query, search within the plurality of pre-computed travel recommendations in the fast access memory of the computer for travel recommendations that satisfy the parameters included in the travel query; and
issue a response to the user, the response including one or more of the pre-computed travel recommendations satisfying the parameters included in the travel query.

* * * * *